United States Patent
Isaksson et al.

(10) Patent No.: US 11,490,313 B2
(45) Date of Patent: Nov. 1, 2022

(54) MANAGING COMMUNICATION IN A WIRELESS COMMUNICATIONS NETWORK

(71) Applicant: Telefonaktiebolaget LM Ericsson (publ), Stockholm (SE)

(72) Inventors: Martin Isaksson, Stockholm (SE); Walter Müller, Upplands Väsby (SE); Azadeh Bararsani, Solna (SE); Rickard Cöster, Hägersten (SE); Tor Kvernvik, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 16/978,833

(22) PCT Filed: Mar. 8, 2018

(86) PCT No.: PCT/SE2018/050223
§ 371 (c)(1),
(2) Date: Sep. 8, 2020

(87) PCT Pub. No.: WO2019/172813
PCT Pub. Date: Sep. 12, 2019

(65) Prior Publication Data
US 2020/0413316 A1    Dec. 31, 2020

(51) Int. Cl.
H04W 4/00      (2018.01)
H04W 36/30     (2009.01)
H04W 24/10     (2009.01)

(52) U.S. Cl.
CPC .......... *H04W 36/30* (2013.01); *H04W 24/10* (2013.01)

(58) Field of Classification Search
CPC . H04W 36/30; H04W 24/10; H04W 36/0088; H04W 36/36
(Continued)

(56) References Cited

U.S. PATENT DOCUMENTS 8,879,507 B2 * 11/2014 Surface ............... H04M 7/0084
                                                455/436
8,948,135 B2 *  2/2015 Surface ............. H04W 36/0094
                                                455/436
(Continued)

FOREIGN PATENT DOCUMENTS

WO    2016072893 A1    5/2016

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.

(Continued)

*Primary Examiner* — Amancio Gonzalez
(74) *Attorney, Agent, or Firm* — Withrow & Terranova, PLLC

(57) ABSTRACT

Some embodiments herein relate to a method performed by a wireless communication device for managing communication in a wireless communications network. The wireless communication device obtains an indicator indicating a model and one or more trained model parameters for the model, wherein the model is related to an event being one of the following events: a handover procedure, a cell reselection procedure, and a beam reselection procedure. The wireless communication device further selects the model based on the obtained indicator. The wireless communication device executes the selected model using the obtained one or more trained model parameters; and triggers a process, being associated with the event, based on an output of the executed model.

20 Claims, 8 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 9,204,351 | B2* | 12/2015 | White | ............. H04W 36/00837 |
| 9,432,901 | B1* | 8/2016 | Kwan | ................... H04L 41/147 |
| 10,070,362 | B2* | 9/2018 | Kwan | ................... H04W 36/22 |
| 10,735,273 | B2* | 8/2020 | Kaplunov | ............... H04L 45/22 |
| 2014/0051449 | A1 | 2/2014 | Yerrabommanahalli et al. | |
| 2015/0036663 | A1 | 2/2015 | Kilpatrick, II et al. | |
| 2015/0141027 | A1 | 5/2015 | Tsui et al. | |
| 2016/0028599 | A1* | 1/2016 | Vasseur | ................... H04L 41/16 370/252 |
| 2017/0026888 | A1* | 1/2017 | Kwan | ................... H04W 36/08 |
| 2017/0063906 | A1* | 3/2017 | Muddu | ................. H04L 41/145 |
| 2017/0078903 | A1* | 3/2017 | Kusashima | ........... H04L 5/0057 |
| 2017/0325138 | A1* | 11/2017 | da Silva | ................ H04W 16/22 |
| 2017/0353260 | A1 | 12/2017 | Wang et al. | |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.0.0, 3GPP Organizational Partners, Dec. 2017, 338 pages.

Hochreiter, Sepp, et al., "Long Short-Term Memory," Neural Computation, vol. 9, No. 8, 1997, pp. 1735-1780.

International Search Report and Written Opinion for International Patent Application No. PCT/SE2018/050223, dated Jan. 9, 2019, 12 pages.

Extended European Search Report for European Patent Application No. 18908841.2, dated Feb. 18, 2021, 9 pages.

* cited by examiner

MANAGING COMMUNICATION IN A WIRELESS COMMUNICATIONS NETWORK

This application is a 35 U.S.C. § 371 national phase filing of International Application No. PCT/SE2018/050223, filed Mar. 8, 2018, the disclosure of which is incorporated herein by reference in its entirety.

TECHNICAL FIELD

Embodiments herein relate to a radio network node, a wireless communication device and methods performed therein regarding wireless communication. Furthermore, a computer program and a computer program product are also provided herein. In particular, embodiments herein relate to managing communication e.g. enabling handover, cell reselection, or beam reselection, of the wireless communication device in a wireless communications network.

BACKGROUND

In a typical wireless communications network, user equipments (UE), also known as wireless communication devices, mobile stations, stations (STA) and/or, wireless communication devices communicate via a Radio access Network (RAN) to one or more core networks (CN). The RAN covers a geographical area which is divided into service areas also referred to as cells or cell areas, with each service area or cell area being served by a radio network node such as an access node e.g. a Wi-Fi access point or a radio base station (RBS), which in some networks may also be called, for example, a NodeB, an eNodeB or a gNodeB. The service area for a radio network node is the geographical area where radio coverage is provided by the radio network node. The radio network node operates on radio frequencies to communicate over an air interface with the wireless communication devices within range of the radio network node. The radio network node communicates downlink (DL) to the wireless communication device and the wireless communication device communicates uplink (UL) to the radio network node.

A Universal Mobile Telecommunications System (UMTS) is a third generation telecommunications network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

The First generation (1G) of wireless telecommunication technology used analogue transmission techniques, which were basically used for transmitting voice signals from the wireless communication devices. All of the standards in 1G use frequency modulation techniques for voice signals and all the handover decisions were taken at the radio network node such as a Base Stations (BS). In 1G, in order to maintain connectivity with the network, the network was in charge of maintaining connectivity with the wireless communication device without any other assistance from the wireless communication device besides the UL transmissions from the wireless communication devices.

Unlike 1G, 2G standards were based on digital communication. In addition, 2G considered the notion of global roaming. In 2G, in order to maintain connectivity with the wireless communications network, the wireless communication device periodically sends measurement reports to indicate to the network its current cell location when voice calls are ongoing, or to make it's cell location known after cell reselection. This means that the wireless communication device sends a location update indication to the network each time it changes its location to a new cell.

In 3G and 4G, the wireless communication device measures on signals from radio network nodes, but typically do not send measurement reports periodically but rather only sends a measurement report when an event criterion in wireless communication device is fulfilled (event triggered), wherein the event criterion is configured by the wireless communications network. By performing periodic reporting of measurements often enough to allow a fast enough response to the wireless communication device, i.e. makes sure that the information reaches the wireless communications network quickly, but only when it is needed, this reduces the cost in terms of e.g. radio resources, wireless communication device battery and network (NVV) processing capacity. There are a number of event criteria configured by the NW e.g.

- A1: Serving cell becomes better than an A1 threshold
- A2: Serving cell becomes worse than an A2 threshold
- A3: Neighbour cell becomes offset better than a primary cell (PCell)
- A4: Neighbour cell becomes better than an A4 threshold
- A5: Primary cell becomes worse than a first threshold and the neighbour cell becomes better than a second threshold
- A6: Neighbour cell becomes offset better than a secondary cell (SCell)
- C1: Channel state information reference signal (CSI-RS) resource becomes better than a C1 threshold C2: CSI-RS resource becomes an offset better than a reference CSI-RS resource B1: Inter radio access technology (RAT), i.e. of a different RAT, neighbour cell becomes better than a B1 threshold B2: PCell becomes worse than a first threshold and inter RAT neighbour cell becomes better than a second threshold In 5G similar event criteria as in LTE e.g. event criteria A1-A6, are expected. Measurements in 5G may be measurements based on best beam or best n beam, and the measurement can be on layer 2 (L2) for beam management or layer 3 (L3) for handover and inter RAT measurements. Inter RAT measurements are measurements on signals of different RATs.

Using these event criteria or similar makes it difficult to optimize for an arbitrary network situation since there may be many parameters involved such as cell size, wireless communication device speed, wireless communication device location, carrier frequency, interference situation, etc. affecting events of the event criteria. Thus, using static thresholds of the events do not work optimally for all wireless communication devices in all situations. Different wireless communication devices may have very different serving cell reference signal received power (RSRP) time series, e.g. a wireless communication device moving slowly indoors has a lower RSRP over time and a wireless communication device moving fast outdoors has a more varying RSRP. Thus, if a static A2 threshold is configured the use of the static A2 threshold may lead to unnecessary reporting and mobility evaluations and eventually unnecessary handovers, or handovers not performed but needed. Measurements and reporting of measurements are costly both for the network and the wireless communication device in terms of processing capacity and/or radio resources. Inter-frequency and inter RAT measurements are even more costly, wherein inter means between different frequencies or RATs. The cost for the NW is an increased use of radio resources, signalling and message processing and an increased risk in some cases for radio link failure due to radio link control (RLC) failures since the wireless communication device may perform an unnecessary handover, or a handover not performed but needed. The cost for the wireless communication device is measurement sampling, signalling and processing which typically increase a battery consumption. US2015/0036663A1 discloses a system that uses an algorithm that modifies e.g. thresholds of events for a certain wireless communication device taking previous behaviour of the wireless communication device into account. Using different event criteria requires a separate configuration per event type and thus requires processing capacity as well as resources for signalling for each event.

SUMMARY

An object of embodiments herein is to provide a mechanism that improves the performance of the wireless communications network when managing communication in a wireless communications network.

According to an aspect the object is achieved by providing a method performed by a wireless communication device for managing communication in a wireless communications network. The wireless communication device obtains an indicator, such as an index, indicating a model, e.g. a function, and one or more trained model parameters for the model, wherein the model is related to an event being one of the following events: a handover procedure, a cell reselection procedure, and a beam reselection procedure. The wireless communication device selects the model based on the obtained indicator, e.g. from a table of indexed models. The wireless communication device further executes the selected model using the obtained one or more trained model parameters. The wireless communication device triggers a process, being associated with the event e.g. measurement reporting, based on an output of the executed model.

According to another aspect the object is achieved by providing a method performed by a radio network node for managing communication in a wireless communications network. The radio network node receives, from one or more wireless communication devices, data associated with measurements performed by the one or more wireless communication devices. The radio network node trains, based on the received data, one or more model parameters of a model for the one or more wireless communication devices, wherein the model is related to an event being one of the following events: a handover procedure, a cell reselection procedure, and a beam reselection procedure. The radio network node further provides, to a wireless communication device, an indicator indicating the model and the one or more trained model parameters for the model.

It is herein also provided a computer program comprising instructions, which, when executed on a processing circuitry, causes the processing circuitry to carry out the methods herein, as performed by the wireless communication device, or the radio network node. Furthermore, it is herein provided a computer program product, having stored thereon a computer program comprising instructions which, when executed on a processing circuitry, cause the processing circuitry to carry out the methods herein, as performed by the wireless communication device, or the radio network node.

According to yet another aspect the object is achieved by providing a wireless communication device for managing communication in a wireless communications network. The wireless communication device comprises a processing circuitry and a memory. The memory contains instructions executable by said processing circuitry whereby said wireless communication device is configured to obtain an indicator, such as an index, indicating a model and one or more trained model parameters for the model, wherein the model is related to an event being one of the following events: a handover procedure, a cell reselection procedure, and a beam reselection procedure. The wireless communication device is further configured to select the model based on the obtained indicator, and to execute the selected model using the obtained one or more trained model parameters. The wireless communication device is configured to trigger a process, being associated with the event, based on an output of the executed model.

According to still another aspect the object is achieved by providing a radio network node for managing communication in a wireless communications network. The radio network node comprises a processing circuitry and a memory, said memory containing instructions executable by said processing circuitry whereby said radio network node is configured to receive, from one or more wireless communication devices, data associated with measurements performed by the one or more wireless communication devices. The radio network node is further configured to train, based on the received data, one or more model parameters of a model for the one or more wireless communication devices, wherein the model is related to an event being one of the following events: a handover procedure, a cell reselection procedure, and a beam reselection procedure. The radio network node is configured to provide to a wireless communication device, an indicator indicating the model and the one or more trained model parameters for the model.

According to embodiments herein each wireless communication device may use individual triggered processes that are predicted to be optimal for the specific conditions of the wireless communication device. It should be noted that there are no explicit dynamically set thresholds but the model with the one or more trained model parameters replaces such thresholds. According to one embodiment, since the model is trained in the RAN, i.e. by the radio network node, and a decision to handover the wireless communication device is also taken in the RAN, the "intelligence" of the system is still within the RAN, but the decision to e.g. send measurement reports or to do conditional handover, being examples of the process triggered, is carried out by the wireless communication device. Embodiments herein provide an efficient way to provide the model and the one or more trained model parameters and lead to an improved performance of the wireless communications network being more flexible when triggering the process during the cell or beam change.

BRIEF DESCRIPTION OF THE DRAWINGS

Embodiments will now be described in more detail in relation to the enclosed drawings, in which.

DETAILED DESCRIPTION

Figure 1:
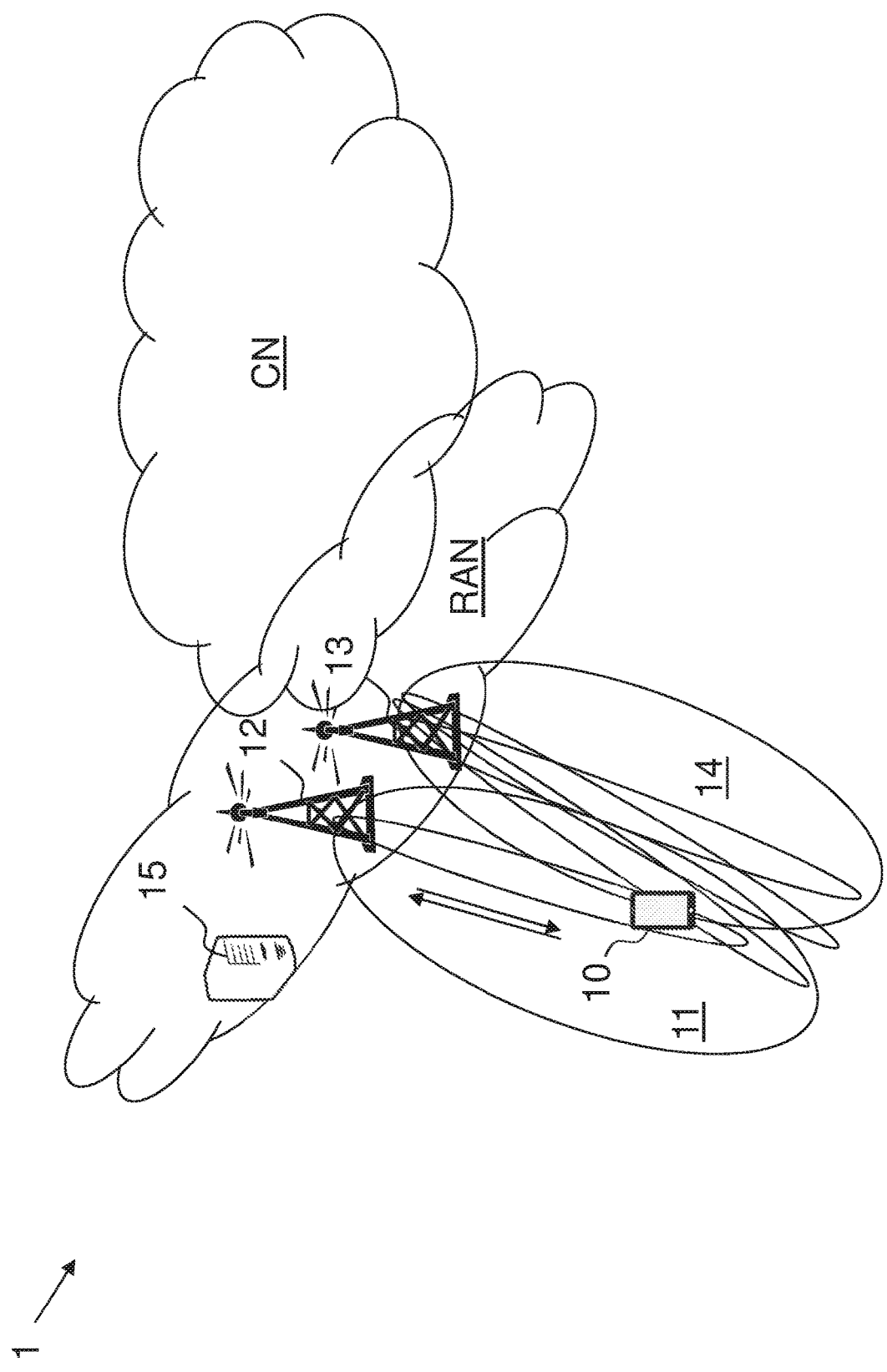
FIG. 1 shows a schematic overview depicting a wireless communications network according to embodiments herein.

Embodiments herein relate to wireless communications networks in general. FIG. 1 is a schematic overview depicting a wireless communications network 1. The wireless communications network 1 comprises one or more RANs and one or more CNs. The wireless communications network 1 may use one or a number of different technologies, such as New Radio (NR), Wi-Fi, LTE, LTE-Advanced, Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in 5G networks such as NR. However, embodiments are also applicable in further development of the existing wireless communication systems such as e.g. LTE and WCDMA.

In the wireless communications network 1, wireless communication devices e.g. a wireless communication device 10 such as a mobile station, a non-access point (non-AP) station (STA), a STA, a user equipment (UE) and/or a wireless terminal, may communicate via one or more Access Networks (AN), e.g. RAN, to one or more core networks (CN). It should be understood by the skilled in the art that "wireless communication device" is a non-limiting term which means any terminal, wireless communication device, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a first radio network node 12, also referred to as merely a radio network node, providing radio coverage over a geographical area, denoted as a first service area 11 or a first beam/beam group, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a gNodeB, NodeB, an evolved Node B (eNodeB), a base transceiver station, a radio remote unit, an access point base station, a base station router, a transmission arrangement of a radio base station, a stand-alone access point or any other network unit or node capable of communicating with a wireless communication device within the service area served by the first radio network node 12 depending e.g. on the first radio access technology and terminology used. The first radio network node 12 may be referred to as a serving network node wherein the first service area 11 may be referred to as a source beam, and the first radio network node 12 serves and communicates with the wireless communication device 10 in form of DL transmissions to the wireless communication device 10 and UL transmissions from the wireless communication device 10.

A second radio network node 13 may further provide radio coverage over a second service area 14, also referred to as a second beam/beam group, of a second radio access technology (RAT), such as NR, LTE, W-Fi, WiMAX or similar. The first RAT and the second RAT may be the same or different RATs. The second radio network node 13 may be a transmission and reception point e.g. a radio network node such as a wireless local-area network (WLAN) access point or an access point station (AP STA), an access node, an access controller, a base station, e.g. a radio base station such as a NodeB, an evolved Node B (eNB, eNode B), a gNodeB, a base transceiver station, a radio remote unit, an access point base station, a base station router, a transmission arrangement of a radio base station, a stand-alone access point or any other network unit or node capable of communicating with a wireless communication device within the area served by the second radio network node 13 depending e.g. on the second radio access technology and terminology used. The second radio network node 13 may be referred to as a neighbouring network node wherein the second service area 14 may be referred to as a neighbouring beam group with neighbouring beams or target beams.

It should be noted that a service area may be denoted as a cell, a beam, a mobility measurement beam, a beam group or similar to define an area of radio coverage. The radio network nodes transmit additional RSs over respective service area. Hence, the first and second radio network nodes may transmit CSI-RSs or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first CSI-RS, for the first service area 11 in the wireless communications network 1. The second radio network node 13 provides radio coverage over the second service area 14 using a second reference signal, e.g. second CSI-RS, for the second service area 14 in the wireless communications network 1. These reference signals, first and second CSI-RSs, may be initiated upon request from a radio network node, e.g. a neighbouring radio network node, or configured to be sent continuously.

One may use dynamically set thresholds for different events, such as A1-A6 mentioned in the background, depending on the wireless communication device mobility patterns, however, embodiments herein replace these thresholds for the events with a model such as a function $f(\cdot)$. According to one embodiment the model is trained at a radio network node, such as the first radio network node 12, or a standalone network node 15, with received data from one or more wireless communication devices. The received data may comprise: current serving beam or cell; direction of one or more neighbouring beams; measured signal strength or quality for one or more neighbouring beams or cells on a serving frequency; measured signal strength or quality for one or more neighbouring beams or cells on one or more other frequencies than the serving frequency; timing advance for the serving beam or cell; pre-coder matrix index; block error rate; capability of supporting one or more models of the one or more wireless communication devices; and movement related data of the one or more wireless communication devices. The training of the model generates one or more trained model parameters, and the model may be a neural network which may be multivariate and time-dependent in that the model takes historical data into account. The model with the one or more trained model parameters is used at the wireless communication device 10 to trigger a process at the wireless communication device 10 such as triggering sending measurement reports to the first radio network node 12 that will decide when to do handover and to which cell. There could be one model replacing all types of event criteria, or several different models. It is herein described the case when there is one model replacing all events. The other case follows the same pattern.

Embodiments herein aim to remove the static thresholds for handover or cell or beam reselection that are used in LTE today by replacing these thresholds with a model that is trained also referred to as machine learning model. This model may be trained in the RAN and the indicator, such as an index, indicating the model is sent to the wireless communication device 10 when the wireless communication device 10 enters the wireless communications network 1, e.g. a cell or a beam of the wireless communications network. The indicator may e.g. be sent as system information (SI), such as in a system information block (SIB) or in a master information block (MIB) for a cell. Thus, there may be one model per cell or beam, or one model per region of cells or beams in which the model is valid. The size of a region is a hyper-parameter, which may be decided during the training of the model based on the received data.

A trained model comprises a structure of the model also referred to as merely the model, and associated one or more trained model parameters such as weights. The wireless communication device 10 may have different pre-configured models and selection of model may be negotiated by the wireless communication device 10 and the radio network node, e.g. depending on a capability of supporting one or more models of the wireless communication device 10. Thus, the model may be selected and an indicator, such as an index, and the one or more trained model parameters are sent to the wireless communication device 10.

The wireless communication device 10 then uses this model to decide whether to trigger one or more of the following processes:
   a) trigger an event to start measuring, for example, on signals of a secondary carrier. Only start measuring on secondary carrier frequency if a probability of coverage is high i.e. above a probability threshold.
   b) trigger a handover event and send information such as measurement reports about serving and neighbouring cells or beams to the first radio network node 12 serving the wireless communication device 10. The first radio network node 12 may then decide where to go, i.e. performs the handover decision. This allows the wireless communications network to prepare the target cell.
   c) initiate a "conditional handover", which means that the wireless communication device performs a handover to the target cell directly when one or more conditions are fulfilled. I.e. the handover decision is taken by the wireless communication device 10 and performs a handover to a target cell/beam. The target radio network node informs the source radio network node that a handover occurred and attaches input data used, i.e. all or some of the input data, e.g. a last value of a serving beam used.
   d) send the model to another wireless communication device using device-to-device (D2D) communication. The radio network node instructs the wireless communication device 10 to forward the indicator indicating the model to a list of wireless communication devices. This can be done at the same time, or at a later time. A benefit of using D2D communication is that possibly less energy can be used to transmit to a wireless communication device that is close-by, rather than using the wireless communications network. Also, wireless communication devices that are close to each other are likely to benefit from using similar or the same model.

Hence, the intelligence, e.g. the responsibility of training the model and/or the handover decision, lies within the wireless communications network 1. The wireless communication device 10 simply uses the model for taking a decision e.g. whether to start reporting signal measurements or not. Furthermore, embodiments herein could be generalized to cases other than handover such as cell or beam reselection for e.g. load balancing or link-adaptation, wherein the wireless communication device 10 has more information than the wireless communications network 1 and can perform some of the tasks traditionally done by the wireless communications network 1. The wireless communication device 10 may be instructed by the wireless communications network 1 to perform these processes such as transmitting measurement reports and/or performing a handover. The wireless communication device 10 will e.g. not have to send unnecessary measurement reports to the radio network node, thus reducing the number of L2 measurement reports sent in 5G, or L3 measurement reports. Thus, a higher utilization of computational power in the wireless communication device 10, and conversely a lower network complexity is herein achieved.

Figure 2:
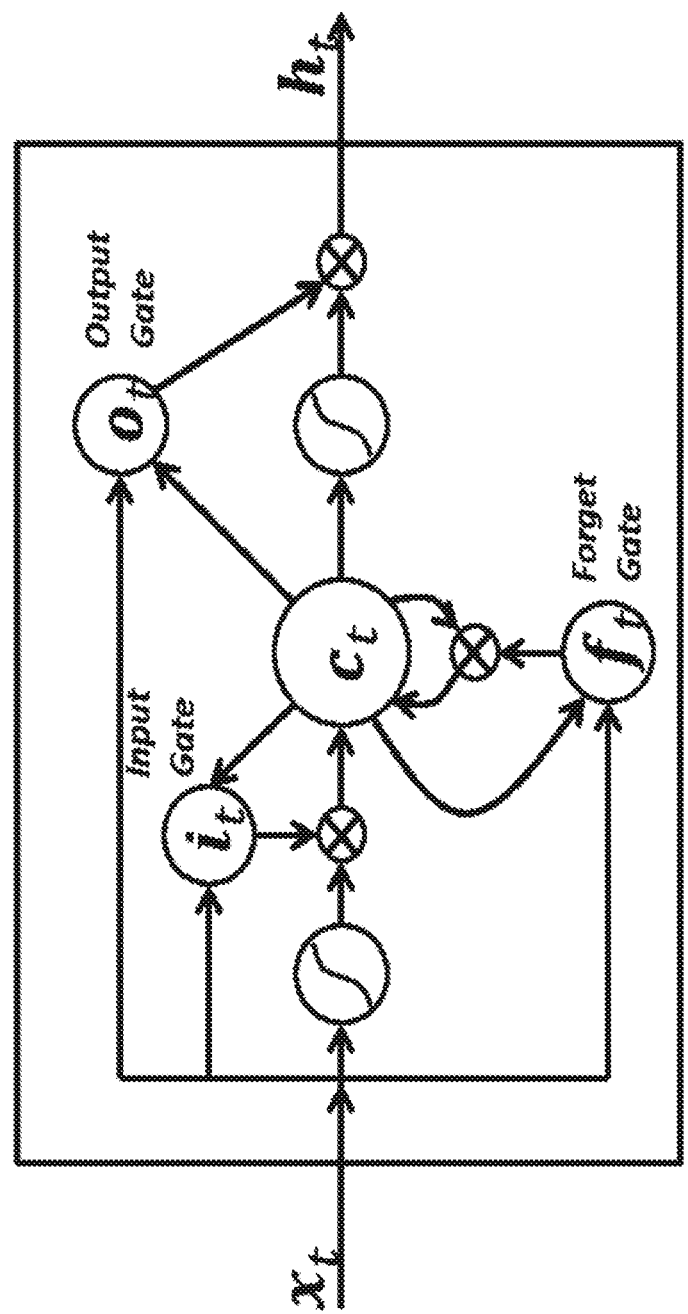
FIG. 2 shows an example of a model according to embodiments herein.

The model used in embodiments herein may be based on a Long short-term memory (LSTM) model described by S Hochreiter, J Schmidhuber, in 1997, which is a type of artificial neural network that is capable of learning order dependence in sequence prediction problems. LSTM architecture is based on the fact that learnings in the past can help in learning in the future. FIG. 2 shows an LSTM node, which gets an input, x, and outputs a value, h. This is while each LSTM cell, c, has the possibility of memorizing and forgetting the previous state before coming up with the output h. The LSTM uses an input gate $i_t$, an output gate $o_t$ and a forgetting gate $f_t$. LSTM allows longer history, while standard methods are very difficult to use with longer time series. We expect that the history used could potentially be long, but the length of the history may be tuned in training (a so called hyper-parameter). Thus, the hyper-parameter tuning is used in training these networks.

Figure 3:
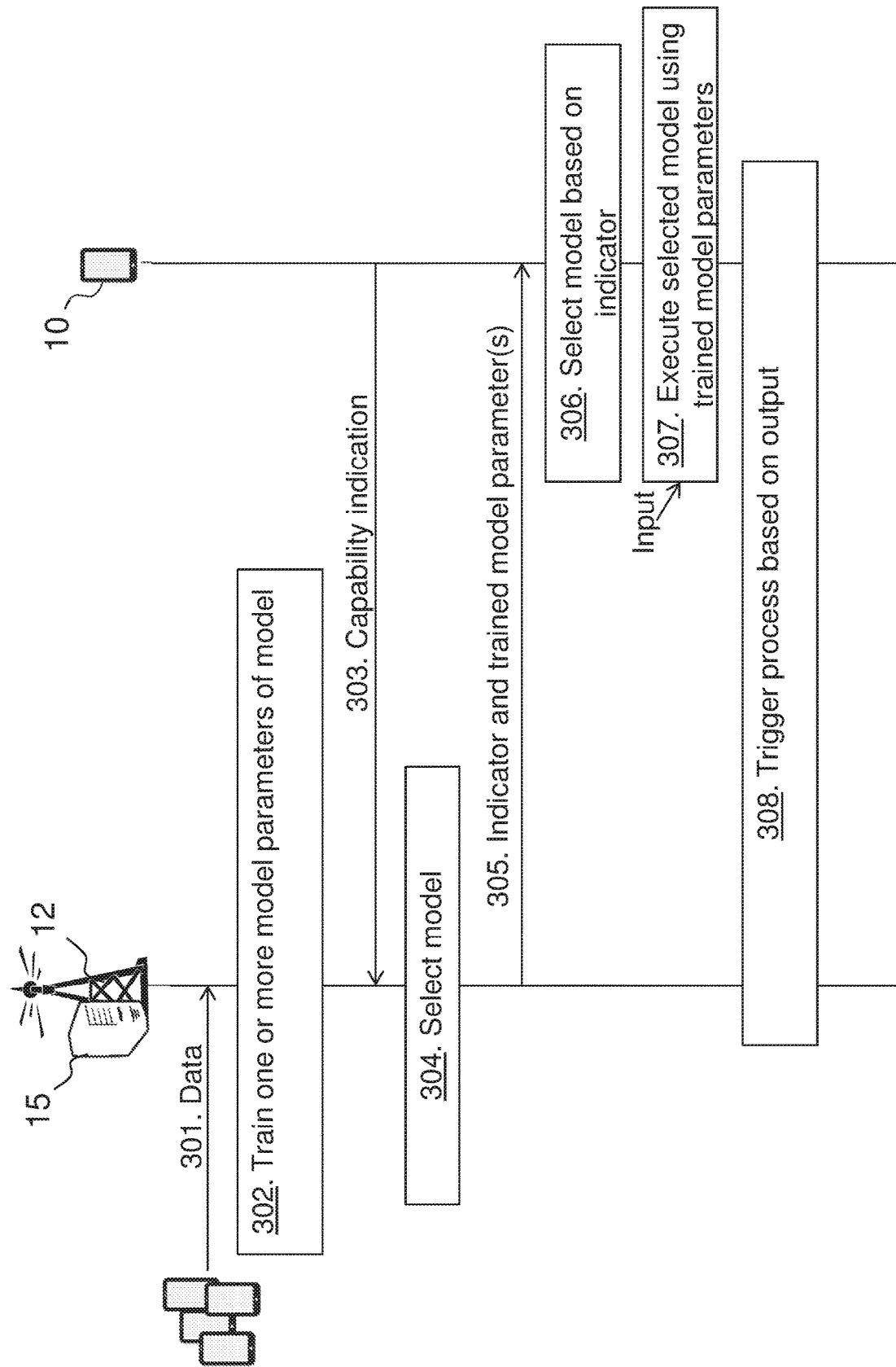
FIG. 3 is a schematic combined flowchart and signalling scheme according to embodiments herein.

FIG. 3 is a combined signalling and flowchart depicting an embodiment herein wherein a radio network node such as the first radio network node 12 or the standalone network node 15 is negotiating model selection with the wireless communication device 10.

Action 301. One or more wireless communication devices transmit data to the radio network node, such as the first radio network node 12 or the stand-alone network node 15. The data is associated with measurements performed by the one or more wireless communication devices such as measurement values, ID of beams or cells, etc. This may be collected periodically which periodicity may be configurable such as a minimum periodicity.

Action 302. The radio network node trains, based on the received data, the one or more model parameters of the model for the one or more wireless communication devices. The radio network node may train a number of models and associate each or a plurality of models with a beam, a cell or a region of cells. The model is for triggering a process of a handover procedure, a cell reselection procedure, and a beam reselection procedure. For example, to decide when to trigger measurement reports for training models, a configuration parameter such as 'ReportInterval' may be set to a minimum value i.e. 120 ms. The reason is that this will enable the wireless communication devices to send measurement reports frequently and thereby make it possible to correlate this with successful handovers. This will be used to label the training data with successful versus unsuccessful measurement reports. If the measurement report resulted in a successful handover this means that the measurement report was needed and vice versa. The training may be performed off-line during a limited period. The model may need to be retrained on a regular basis e.g. twice every day. To train a more accurate model the inputs of many wireless communication devices are used, which is why the training may be performed in the wireless communications network. The radio network node may select all or a subset of the wireless communication devices to produce the training data. The number of wireless communication devices and which wireless communication devices selected to produce a single model depends on the geographical area the model covers and the capability of the wireless communication devices. The radio network node may train several models of different structures for wireless communication devices with different capabilities, and therefore needs to store structures and one or more trained model parameters for respective model.

Action 303. The wireless communication device 10 signals the network which one or more models the wireless communication device 10 supports. E.g. the wireless communication device 10 may signal a list indicating one or more models the wireless communication device 10 supports.

Action 304. The radio network node may select the model out of a number of models based on the capability, of the wireless communication device 10, of supporting one or more models and/or a position of the wireless communication device. E.g. wireless communication devices in a certain area may use the same model. The radio network node may take the capability into consideration and thus negotiate a model to use.

Action 305. The radio network node provides to the wireless communication device 10, the indicator indicating the model and the one or more trained model parameters for the model. E.g. to select the model, the first radio network node 12 sends an index that points to a predetermined model, to which the wireless communication device 10 applies the one or more trained model parameters that is sent by the first radio network node 12. This model can be valid for the current beam, node or a wider scope, so that an indicator does not have to be transmitted at every setup or handover. The indicator may be transmitted in a radio resource control (RRC) message or similar, e.g. at initial context setup of the wireless communication device 10.

Action 306. The wireless communication device 10 thus selects the model based on the indicator e.g. from a list with indexed models already preconfigured at the wireless communication device 10.

Action 307. The wireless communication device 10 executes selected model using the one or more trained model parameters. Further input to the model may be provided from the wireless communication device 10 such as a current serving beam or cell, measured RSRP and/or RSRQ of neighbouring beams or cells on serving frequency and/or other frequencies than the serving frequency, timing Advance (TA) for the serving cell or beam, pre-coder matrix index (PMI), time series of the RSRP and identities (ID) of the past serving beams for the wireless communication device that is currently served by this very beam, and block error rate (BLER).

Action 308. The wireless communication device 10 then triggers a process based on the output of the executed model. E.g. the wireless communication device may: trigger sending measurement reports to the radio network node, which is responsible for the handover decision; trigger a handover directly, e.g. conditional handover; or trigger measurements on neighbouring nodes, possibly on other frequencies. In case the process is triggering sending of measurement reports it may either be inter node/frequency reports or intra node measurement reports. This enables the wireless communication device 10 to minimize the frequency of the inter frequency measurement and sending of the RRC measurement reports. The radio network node may then make the handover decision based on the reports.

Figure 4:
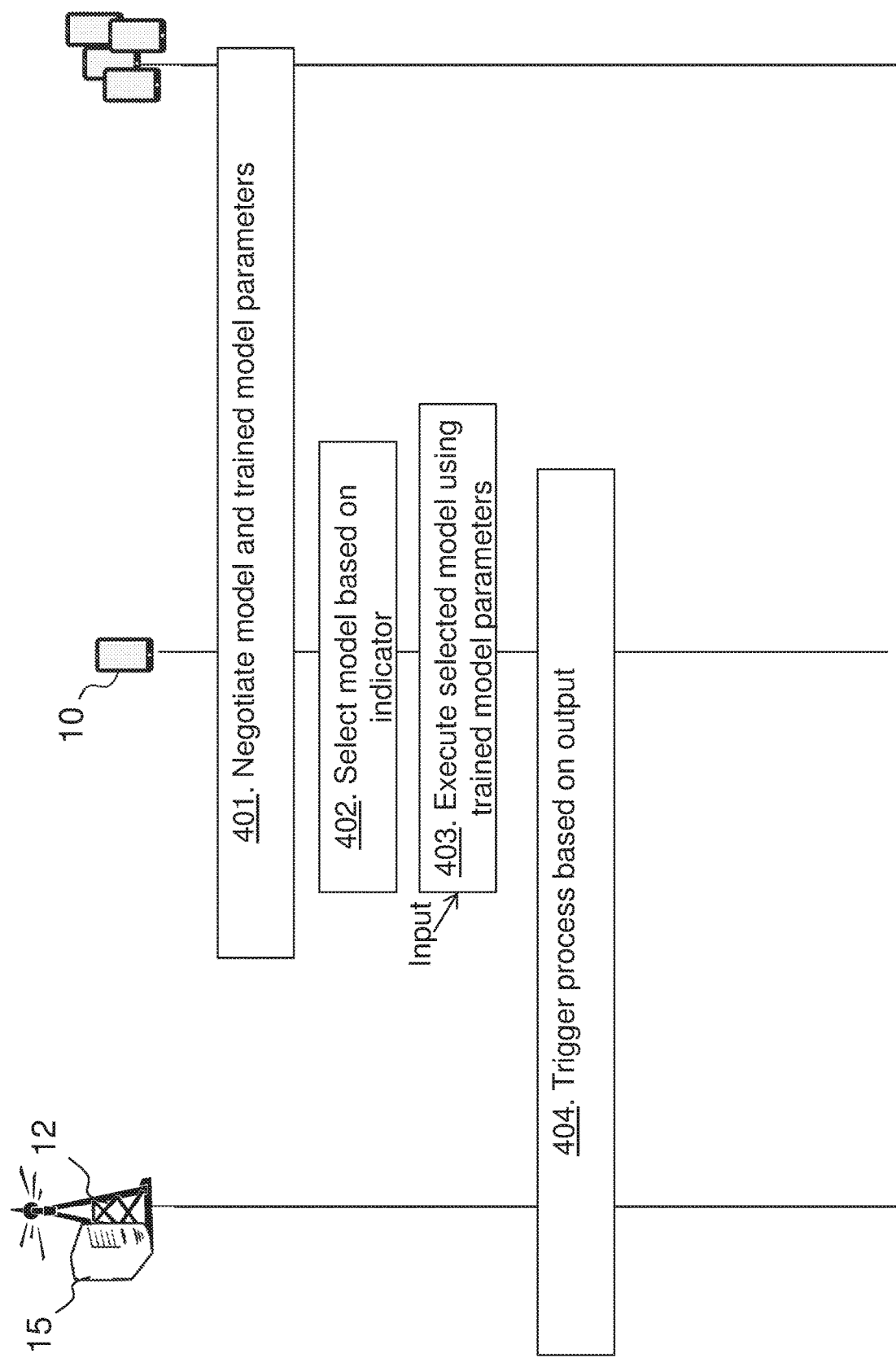
FIG. 4 is a schematic combined flowchart and signalling scheme according to embodiments herein.

FIG. 4 is a combined signalling and flowchart depicting an embodiment herein wherein selection of the model and training of the one or more model parameters is performed by negotiating with one or more other wireless communication devices. Thus, a training algorithm may be performed in the wireless communication device 10. Wireless communication devices may in the future be better equipped to do such processing.

Action 401. The wireless communication device 10 may negotiate with other wireless communication devices to obtain the indicator indicating the model and one or more trained model parameters for the model. The wireless communication device 10 may receive input data from the other wireless communication devices and then determine which model and thus which indicator to use.

Action 402. The wireless communication device 10 further selects the model based on the obtained indicator.

Action 403. The wireless communication device 10 executes the selected model using the obtained one or more trained model parameters. Further input to the model may be provided from the wireless communication device 10 such as a current serving beam or cell, measured RSRP and/or RSRQ of neighbouring beams or cells on serving frequency and/or other frequencies than the serving frequency, TA for the serving cell or beam, PMI, time series of the RSRP and IDs of the past serving beams for the wireless communication device that is currently served by this very beam, and BLER.

Action 404. The wireless communication device 10 thus triggers the process such as measurement reporting based on the output of the executed model. The wireless communication device 10 may use the model to either: trigger sending measurement report to the first radio network node 12 (which is then responsible for the handover decision); trigger a handover directly (conditional handover); or trigger measurements on neighbouring nodes (possibly on other frequencies).

In an example of implementing the solution in a 5G network, each radio network node provides quite a number of beams, and thus each wireless communication device may observe a big number of beams that are around the wireless communication device. In the current status of 5G, the assignment of beams to wireless communication devices is not based on specific parameters. This means that for a wireless communication device to be served by a beam with a high enough RSRP, it should itself measure the RSRP of the beams around it and go for a beam with high/highest RSRP. This is why measuring the signal strength of all the available beams (and communicating it to the radio network node) is costly both for the wireless communication device and for the radio network node. Embodiments herein use machine learning, also referred to as training, and learn from e.g. the current serving beam measurements, and given the current serving beam, use this learning to predict the next best beam(s) for serving the wireless communication device 10 such as a next best beam=best beam in the next unit of time. Knowing the current serving beam for the wireless communication device 10 and its RSRP is not necessarily enough for knowing the next best beam since the wireless communication device 10 could be moving in any direction, or stand still, and therefore different beams could be used as the best beam, wherein best beam=beam with RSRP above a threshold or higher that of other beams.

Another point to consider is that movements of the wireless communication device 10 may help in predicting future position of the wireless communication device 10 and therefore be taken as a parameter in predicting the best beam.

When training the model the radio network node 12 collects input data from one or more wireless communication devices. The same input data may also be provided to the model when executing the model at the wireless communication device 10. The input data for the model may be, for example:

a current serving beam. This helps with narrowing down the considered beams as potentially next best beam. Depending on what is the current serving beam, beams that this beam has historically had interaction with are used in the model, assuming that they must be neighbouring beam and therefore have strong enough RSRP and/or RSRQ.

measured RSRP and/or RSRQ of neighbouring beams. Measured RSRP and/or RSRQ is a wireless communication device based feature where the wireless communication device in the wireless communications network is assumed to send RSRP and/or RSRQ measurement reports, containing e.g. L3-measurements of the measured values of the serving cell and up to eight neighbouring cells on the serving carrier or frequency. Note that the RSRP and/or RSRQ for a non-detectable cell is also fed to the model since a non-detectable cell is also useful information in the model.

measured RSRP and/or RSRQ of neighbouring beams on other frequencies than the serving frequency, i.e. inter-frequency measurements.

timing Advance (TA) for the serving cell or beam(s). The timing advance is a wireless communications network based feature that is used to synchronize wireless communication devices to their serving radio network nodes such that the uplink transmissions arrive within an expected time window e.g. expected sub frame. The TA can thus be seen as a measure of the length of the propagation path. In scattering environments, this length is not necessarily the distance between the wireless communication device and the serving radio network node. The timing advance may be quantized into time slots, $T\_s$, where $T\_s$ is defined in LTE specifications such as 3GPP 36.211 v.13.0.0.

pre-coder matrix index (PMI). The macro cells are assumed to have a few antenna ports with precoder choices for single layer transmissions. The PMI contains a precoder choice for the serving cell of the wireless communication device 10 and is a network based feature. Each precoder choice corresponds to a transmission of energy in a certain direction, which for open areas gives a clear indication of the angular position of the wireless communication device 10 relative to the first radio network node 12. For more scattering environments such as in urban areas, this correlation is not as clear since the signal path may comprise several non-line of sight paths due to reflections and diffractions. Thus, PMI is related to movement of the wireless communication device 10.

the time series of the RSRP and identities (ID) of the past serving beams for the wireless communication device that is currently served by this very beam. Thus, this is also related to movement of the wireless communication device 10.

block error rate (BLER)

other input data that the wireless communication device 10 has access to but not the radio network node.

Since the historical values of these input data are of interest, the wireless communication device 10 may store a limited history of each of these inputs.

A machine learning algorithm that can cope well with time series, e.g LSTM, or Gated recurrent unit (GRU) may be used as the model. These are current state of the art algorithms for this type of problems, but there are many other types of machine learning models that can be used. The output may be the predicted next beam or beams with the predicted strongest RSRP with some conditional probabilities, P(next beam|x), where x is the input data.

Next beam quality (for example RSRP), strongest cell (on secondary carrier) stronger than the serving cell (to replace A3/A5)

Expected duration when the wireless communication device will stay in the beam.

Beams with higher probability would be more likely to be better suited as the serving beam for the given user.

Note that there are no explicit dynamically set thresholds, the output may be a next beam directly and thus the thresholds are replaced with the model such as e.g. a neural network. The model may be a neural network wherein inputs of the neural network are based on time series such as a machine learning algorithm that copes well with time series such as a recurrent neural network (RNN) model e.g. a LSTM or a Gated recurrent unit (GRU). Other types of models may alternatively be used. The model may be one of a set of predefined models, indexed e.g. by a single number. The model may be a neural network and the one or more model parameters may represent connections between nodes in the neural network and the strength of those connections, e.g. weights. If a weight from a node to another is large, it means that the output of a first node has a greater influence on a second node. A trained model may be represented by a set of such weights and the model structure, i.e. how the nodes of the neural network are connected.

Since an aim of embodiments herein may be to reduce the number of costly measurements, there could be one model per cell, i.e. covering a large area with many beams. This reduces the need for large or many configurations, and allows us to use a larger model. As an alternative, one model per beam may be used, wherein the model may be trained per beam and indicated as selected to the wireless communication device 10 for each beam. This however may require that a new indicator is sent to the wireless communication device 10 at each beam switch, or that many indicators are sent to the wireless communication device at once each being associated with a beam. Note that in neural networks it is possible to share model parameters between layers (parameter sharing in multi-task learning), so the number of bits that is sent to the wireless communication device 10 does not increase as fast with the number of models.

When configuring the wireless communication device with one or more preconfigured models, lower layers in the model may learn basic features (color and edges in images are examples of this), and thus less bits may be sent to the wireless communication device. For example, if the model contains ten layers, the first five may be general and therefore will be the same between different models and only sent one time as opposed to the upper five layers that may be sent for each model.

The wireless communication device 10 uses the model for inference only, i.e. to produce an output from an already trained model. This may require a series of matrix multiplications and non-linearity functions which can be heavy for the wireless communication device 10. Wireless communication devices that do not have specialized hardware are targeted for doing this processing, but as the performance of the model increases with the size of the model, wireless communication devices may need specialized hardware. The wireless communication devices may have different capabilities. A low-end wireless communication device might not be able to use a large model that a high-end wireless communication device can. There may be a negotiation between the radio network node and the wireless communication device on which model to select as mentioned in action 304 above.

Figure 5:
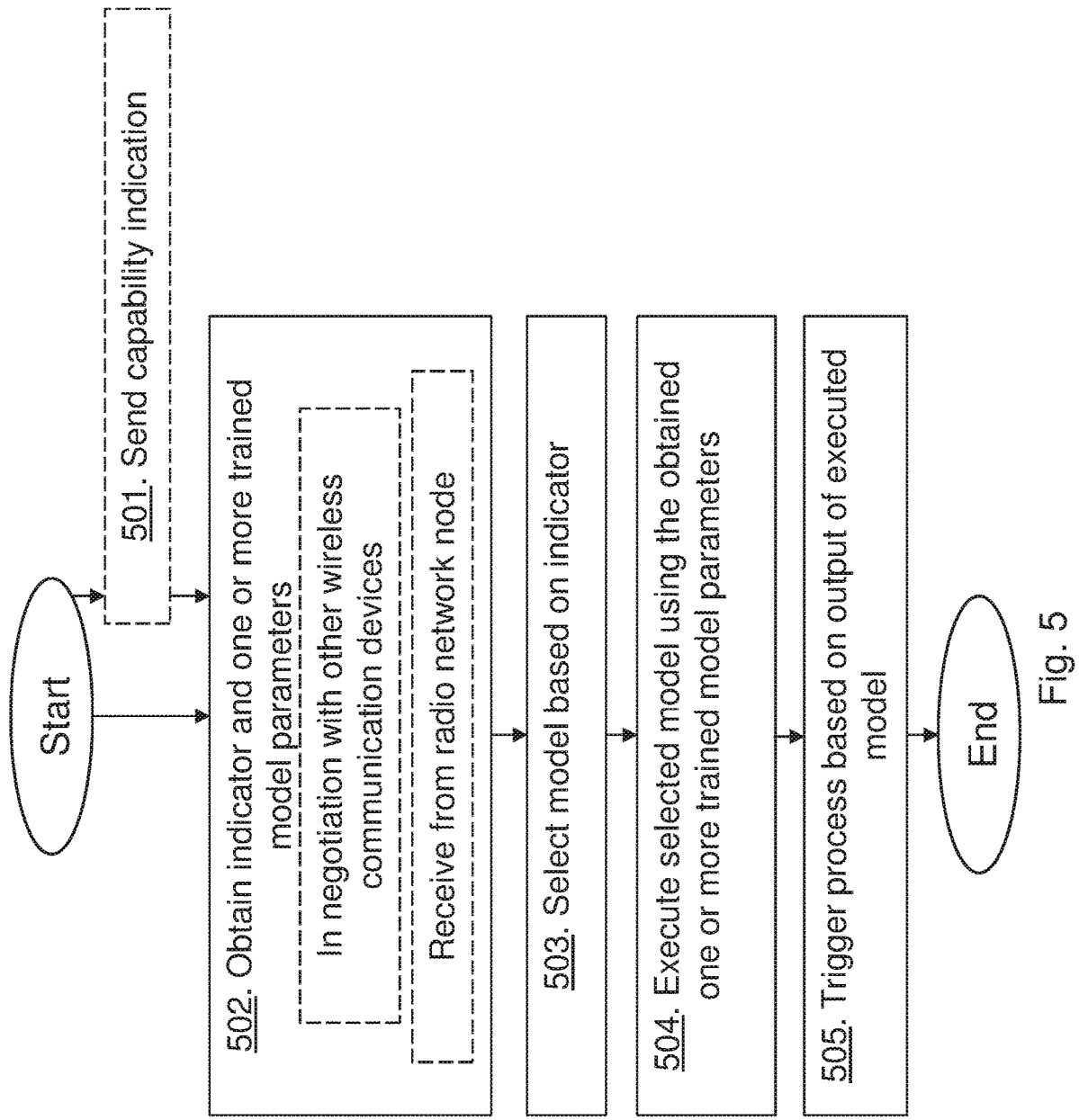
FIG. 5 shows a method performed by a wireless communication device according to embodiments herein.

The method actions performed by the wireless communication device 10 in the wireless communications network 1 according to embodiments herein will now be described with reference to a flowchart depicted in FIG. 5. The actions do not have to be taken in the order stated below, but may be taken in any suitable order. Actions performed in some embodiments are marked with dashed boxes.

Action 501. The wireless communication device 10 may send a capability indication to the radio network node, wherein the capability indication indicates a capability of supporting one or more models at the wireless communication device 10.

Action 502. The wireless communication device 10 obtains the indicator, such as an index, indicating the model and the one or more trained model parameters for the model. The model is related to the event being one of the following events: a handover procedure, a cell reselection procedure, and a beam reselection procedure. The one or more trained model parameters may comprise one or more weights for the model indicated by the indicator. The wireless communication device 10 may obtain the indicator and the one or more trained model parameters in negotiation with other wireless communication devices. Thus, the wireless communication device 10 may train the model with other wireless communication devices. The wireless communication device 10 may obtain the indicator and the one or more trained model parameters by receiving, from the radio network node such as the first radio network node 12 serving the wireless communication device 10 or the stand-alone network node 15, the indicator and the one or more trained model parameters. Thus, the radio network node may train and select the model.

Action 503. The wireless communication device 10 selects the model based on the obtained indicator.

Action 504. The wireless communication device 10 executes the selected model using the obtained one or more trained model parameters. The model may be a neural network such as a recurrent neural network, and/or inputs of the neural network may be based on time series. Time series meaning that historical data is considered e.g. within a time interval.

Action 505. The wireless communication device 10 triggers the process, being associated with the event, based on the output of the executed model. The process, which is associated with the event e.g. the process may be a part of the event, may be one or more of the following: measuring signals of one or more cells or beams; sending one or more measurement reports about serving and/or neighbouring cells or beams to a radio network node 12 serving the wireless communication device 10; and initiating a conditional handover or a cell or beam reselection.

Figure 6:
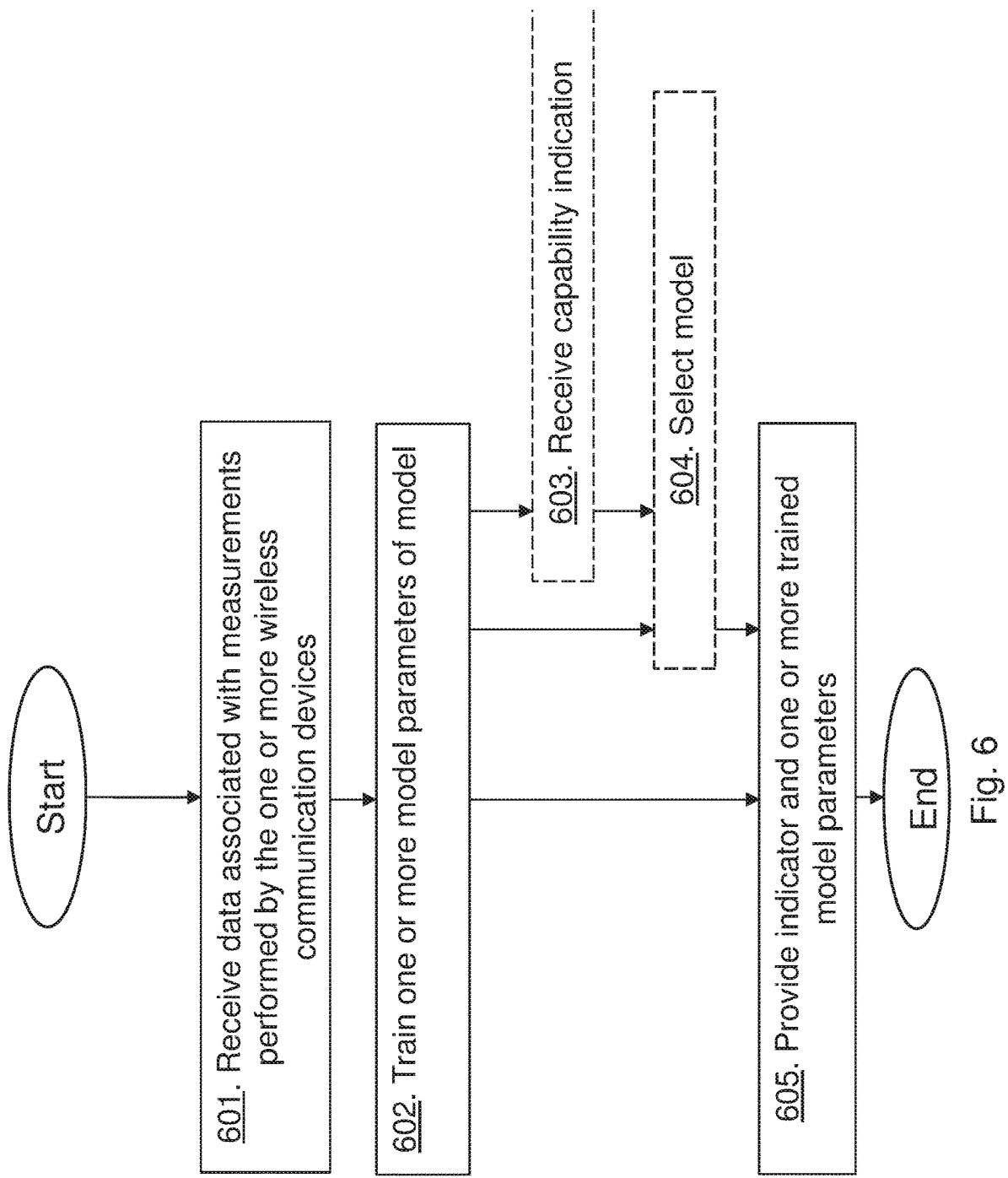
FIG. 6 shows a method performed by a radio network node according to embodiments herein.

The method actions performed by the radio network node such as the first radio network node 12 or the stand-alone network node 15 for managing communication in the wireless communications network 1 according to embodiments herein will now be described with reference to a flowchart depicted in FIG. 6. The actions do not have to be taken in the order stated below, but may be taken in any suitable order. Actions performed in some embodiments are marked with dashed boxes.

Action 601. The radio network node receives, from one or more wireless communication devices, the data associated with measurements performed by the one or more wireless communication devices.

Action 602. The radio network node trains, based on the received data, one or more model parameters of the model for the one or more wireless communication devices, wherein the model is related to the event being one of the following events: a handover procedure, a cell reselection procedure, and a beam reselection procedure. The received data may comprise one or more of the following: current serving beam or cell; direction of one or more neighbouring beams; measured signal strength or quality for one or more neighbouring beams or cells on a serving frequency; measured signal strength or quality for one or more neighbouring beams or cells on one or more other frequencies than the serving frequency; timing advance for the serving beam or cell; pre-coder matrix index; block error rate; capability of supporting one or more models of the one or more wireless communication devices; and movement related data of the one or more wireless communication devices, such as position, direction of wireless communication devices.

Action 603. The radio network node may receive the capability indication from the wireless communication device 10, wherein the capability indication indicates the capability, of the wireless communication device 10, of supporting one or more models.

Action 604. The radio network node may select the model out of the number of models based on the capability, of the wireless communication device 10, of supporting one or more models and/or a position of the wireless communication device 10.

Action 605. The radio network node further provides to the wireless communication device 10, the indicator indicating the model and the one or more trained model parameters for the model. The indicator indicating the model and/or the one or more trained model parameters may be allocated for one beam, one cell or a plurality of cells. Thus, the radio network node may transmit an indicator for each beam, cell or region of cells or beams. The radio network node may transmit the indicator per switch of cell or beam, or transmit a plurality of indicators of different beams or cells. The radio network node may provide different indicators and/or different one or more trained model parameters for different beams, cells or regions of cells. The one or more trained model parameters may comprise one or more weights for the model indicated by the indicator. The model may be a neural network, and the inputs of the neural network may be based on time series.

Figure 7:
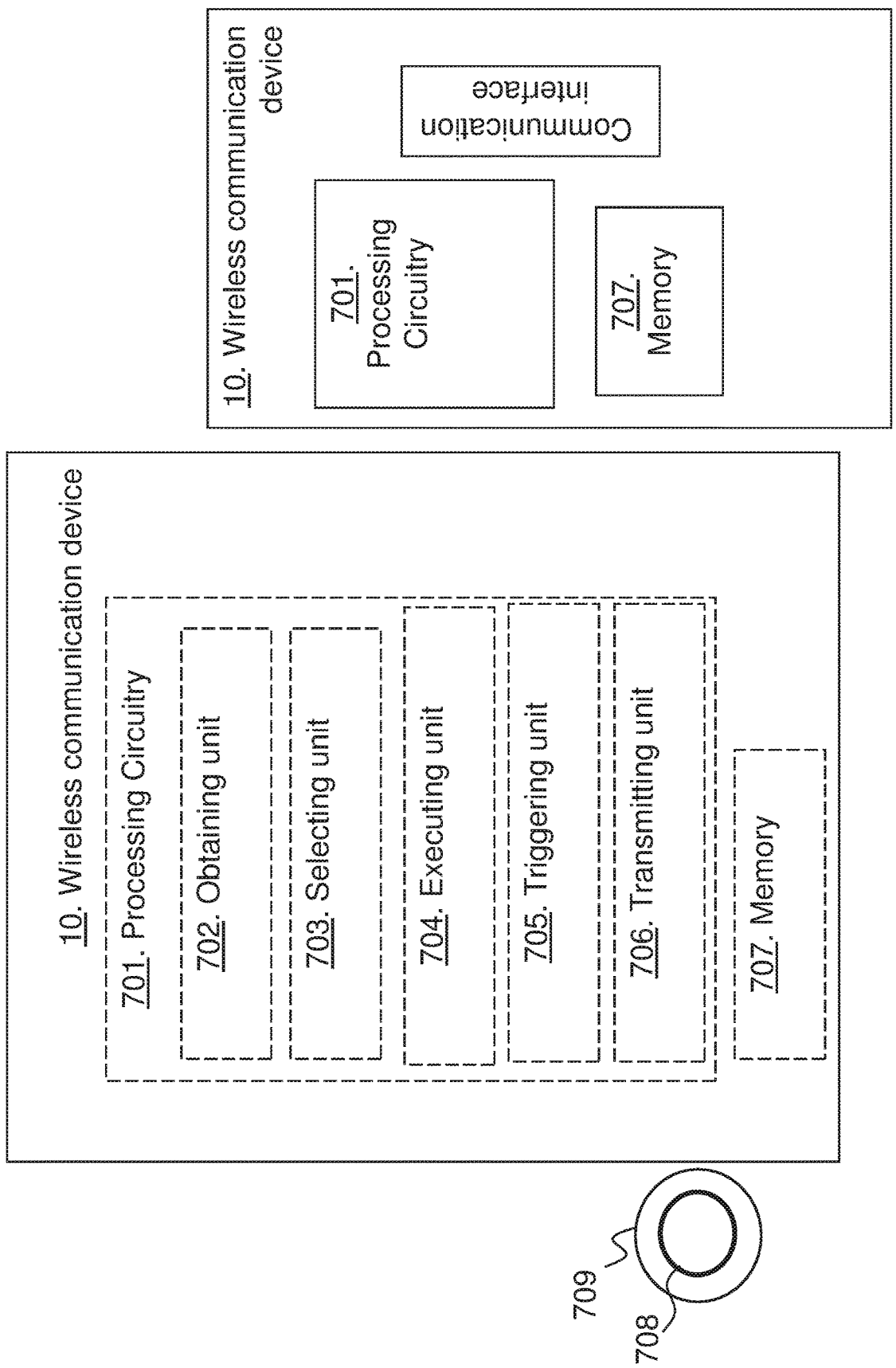
FIG. 7 is a block diagram depicting a wireless communication device according to embodiments herein.

FIG. 7 is a block diagram depicting, in two embodiments, the wireless communication device 10 according to embodiments herein for managing communication in the wireless communications network 1, e.g. for selecting a radio network node, cell or beam for the wireless communication device 10. The wireless communication device 10 comprises a processing circuitry 701 and a memory 707, said memory 707 containing instructions executable by said processing circuitry 701 whereby said wireless communication device 10 is configured to perform the method herein.

The wireless communication device 10 may comprise an obtaining unit 702. The wireless communication device 10, the processing circuitry 701, and/or the obtaining unit 702 is configured to obtain the indicator indicating the model and the one or more trained model parameters for the model. The model is related to an event being one of the following events: a handover procedure, a cell reselection procedure, and a beam reselection procedure. The wireless communication device 10, the processing circuitry 701, and/or the obtaining unit 702 may be configured to obtain the indicator and the one or more trained model parameters in negotiation with other wireless communication devices. The wireless communication device 10, the processing circuitry 701, and/or the obtaining unit 702 may be configured to obtain the indicator and the one or more trained model parameters by receiving, from the radio network node, the indicator and the one or more trained model parameters. The one or more trained model parameters may comprise one or more weights for the model indicated by the indicator. The model may be a neural network, wherein inputs of the neural network may be based on time series.

The wireless communication device 10 may comprise a selecting unit 703. The wireless communication device 10, the processing circuitry 701, and/or the selecting unit 703 is configured to select the model based on the obtained indicator.

The wireless communication device 10 may comprise an executing unit 704. The wireless communication device 10, the processing circuitry 701, and/or the executing unit 704 is configured to execute the selected model using the obtained one or more trained model parameters.

The wireless communication device 10 may comprise a triggering unit 705. The wireless communication device 10, the processing circuitry 701, and/or the triggering unit 705 is configured to trigger the process, being associated with the event, based on the output of the executed model. The event may be associated with measurements of signals. The process, being associated with the event, may be one or more of the following: measuring signals of one or more cells or beams; sending one or more measurement reports about serving and/or neighbouring cells or beams to a radio network node 12 serving the wireless communication device 10; and initiating a conditional handover or a cell or beam reselection.

The wireless communication device 10 may comprise a transmitting unit 706, e.g. a transmitter or a transceiver. The wireless communication device 10, the processing circuitry 701, and/or the transmitting unit 706 may be configured to send the capability indication to the radio network node. The capability indication may indicate the capability of supporting one or more models at the wireless communication device 10. The wireless communication device 10, the processing circuitry 701, and/or the transmitting unit 706 may be configured to transmit measurement data such as measurement reports to the radio network node.

The wireless communication device 10 further comprises the memory 707. The memory comprises one or more units to be used to store data on, such as CSI-RSs, conditions, mappings, models, indices of models, model parameters, strengths or qualities, applications to perform the methods disclosed herein when being executed, and similar. The wireless communication device 10 may further comprise a communication interface comprising a transmitter, a receiver, a transceiver and/or one or more antennas.

The methods according to the embodiments described herein for the wireless communication device 10 are respectively implemented by means of e.g. a computer program 708, comprising instructions, i.e., software code portions, which, when executed on the processing circuitry 701, cause the processing circuitry 701 to carry out the actions described herein, as performed by the wireless communication device 10. The computer program 708 may be stored on a computer program product 709, e.g. a disc, a universal serial bus (USB) stick, memory or similar. The computer program product 709, having stored thereon the computer program 708, may comprise the instructions which, when executed on the processing circuitry 701, cause the processing circuitry 701 to carry out the actions described herein, as performed by the wireless communication device 10. In some embodiments, the computer-readable storage medium may be a non-transitory computer-readable storage medium. Thus, the wireless communication device 10 may comprise the processing circuitry and the memory, said memory comprising instructions executable by said processing circuitry whereby said wireless communication device is operative to perform the methods herein.

Figure 8:
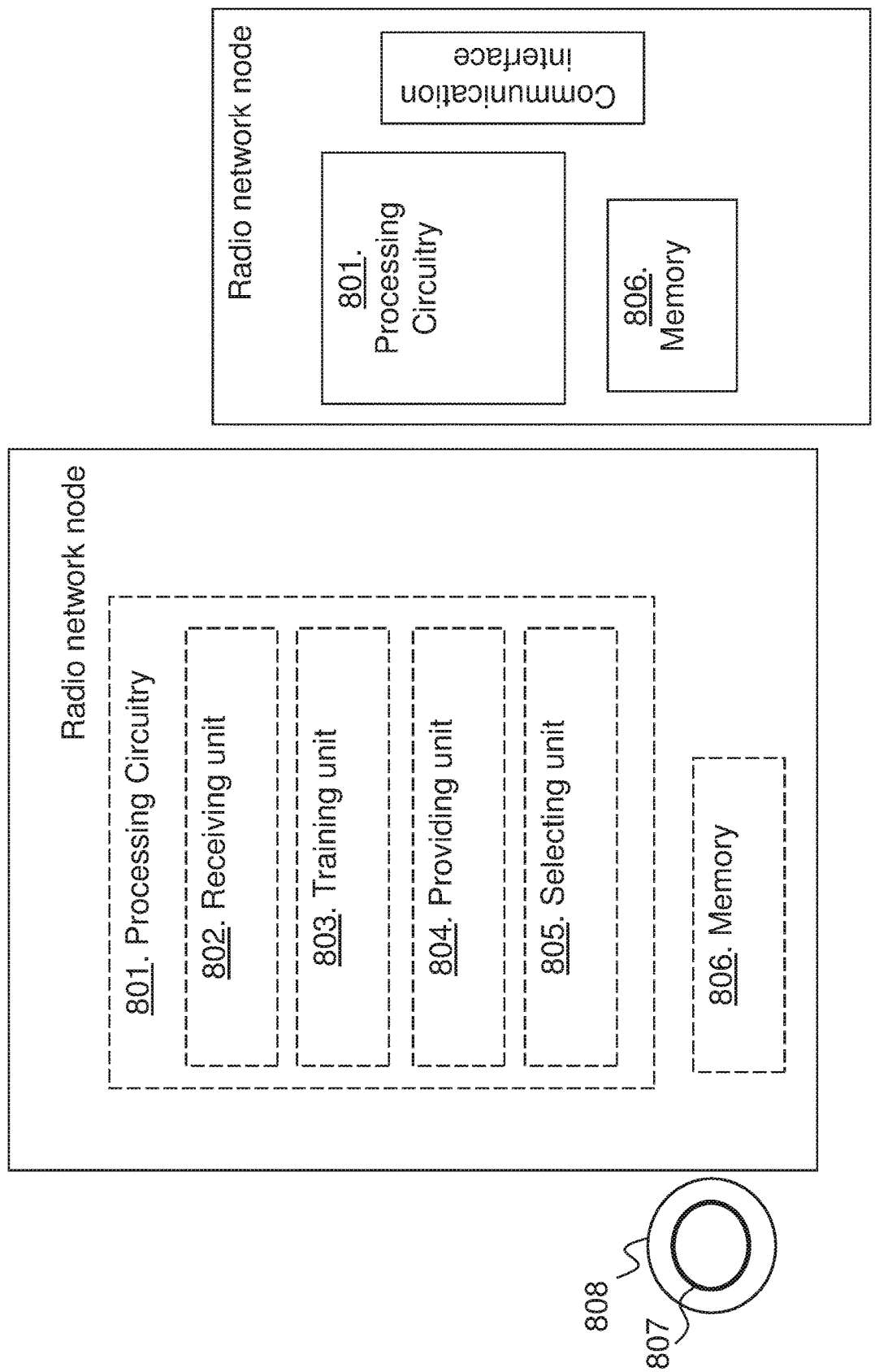
FIG. 8 is a block diagram depicting a radio network node according to embodiments herein.

FIG. 8 is a block diagram depicting, in two embodiments, the radio network node such as the first radio network node 12 serving the wireless communication device 10 or the stand-alone network node 15 according to embodiments herein for managing communication in the wireless communications network 1. The radio network node comprises a processing circuitry 801 and a memory 806, said memory 806 containing instructions executable by said processing circuitry 801 whereby said radio network node is configured to perform the methods herein.

The radio network node may comprise a receiving unit 802, e.g. a receiver or a transceiver. The radio network node, the processing circuitry 801, and/or the receiving unit 802 is configured to receive, from one or more wireless communication devices, data associated with measurements performed by the one or more wireless communication devices. The received data may comprise one or more of the following: current serving beam or cell; direction of one or more neighbouring beams; measured signal strength or quality for one or more neighbouring beams or cells on a serving frequency; measured signal strength or quality for one or more neighbouring beams or cells on one or more other frequencies than the serving frequency; timing advance for the serving beam or cell; pre-coder matrix index; block error rate; capability of supporting one or more models of the one or more wireless communication devices; and movement related data of the one or more wireless communication devices.

The radio network node may comprise a training unit 803. The radio network node, the processing circuitry 801, and/or the training unit 803 is configured to train, based on the received data, one or more model parameters of the model for the one or more wireless communication devices. The model is related to an event being one of the following events: a handover procedure, a cell reselection procedure, and a beam reselection procedure.

The radio network node may comprise a providing unit 804, e.g. a transmitter or a transceiver. The radio network node, the processing circuitry 801, and/or the providing unit 804 is configured to provide to the wireless communication device 10, the indicator indicating the model and the one or more trained model parameters for the model. The radio network node, the processing circuitry 801, and/or the providing unit 804 may be configured to provide different indicators and/or different one or more trained model parameters for different beams, cells or regions of cells. The one or more trained model parameters comprise one or more weights for the model indicated by the indicator. The model may be a neural network e.g. a recurrent neural network wherein the inputs of the neural network may be based on time series.

The radio network node may comprise a selecting unit 805. The radio network node, the processing circuitry 801, and/or the selecting unit 805 may be configured to select the model out of a number of models based on the capability, of the wireless communication device 10, of supporting one or more models and/or the position of the wireless communication device 10.

The radio network node, the processing circuitry 801, and/or the receiving unit 802 may be configured to receive the capability indication from the wireless communication device 10, wherein the capability indication indicates the capability, of the wireless communication device 10, of supporting one or more models.

The radio network node comprises the memory 806. The memory comprises one or more units to be used to store data on, such as CSI-RSs, models, indices of models, input data, output data, model parameters, applications to perform the methods disclosed herein when being executed, and similar. The radio network node may further comprise a communication interface comprising a transmitter, a receiver, a transceiver and/or one or more antennas.

The methods according to the embodiments described herein for the radio network node are respectively implemented by means of e.g. a computer program 807, comprising instructions, i.e., software code portions, which, when executed on the processing circuitry 801, cause the processing circuitry 801 to carry out the actions described herein, as performed by the radio network node. The computer program 807 may be stored on a computer program product 808, e.g. a disc, a USB stick, memory or similar. The computer program product 808, having stored thereon the computer program, may comprise the instructions which, when executed on the processing circuitry 801, cause the processing circuitry 801 to carry out the actions described herein, as performed by the radio network node. In some embodiments, the computer-readable storage medium may be a non-transitory computer-readable storage medium. Thus, the radio network node may comprise the processing circuitry and the memory, said memory comprising instructions executable by said processing circuitry whereby said radio network node is operative to perform the methods herein.

It should be noted that in a general scenario the term "radio network node" can be substituted with "transmission and reception point". It is possible to make a distinction between the transmission reception points (TRPs), typically based on CSI-RSs or different synchronization signals and BRSs transmitted. Several TRPs may be logically connected to the same radio network node but if they are geographically separated, or are pointing in different propagation directions, the TRPs will be subject to the same issues as different radio network nodes. In subsequent sections, the terms "radio network node" and "TRP" can be thought of as interchangeable.

It should further be noted that a wireless communications network may be virtually sliced into a number of Network/RAN slices, each Network/RAN slice supports one or more type of wireless communication devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

In some embodiments a more general term "radio network node" is used and it can correspond to any type of radio network node or any network node, which communicates with a wireless communication device and/or with another network node. Examples of network nodes are NodeB, gNodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless communication device or user equipment (UE) is used and it refers to any type of wireless communication device communicating with a network node and/or with another wireless communication device in a cellular or mobile communication system. Examples of wireless communication devices are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE Frequency Duplex Division/Time Duplex Division (FDD/TDD), WCDMA/HSPA, GSM/GERAN, Wi-Fi, WLAN, CDMA2000 etc.

The anticipated difference between cell and beam in this context is that beam measurement and reporting differs from cell measurement and reporting. Beam management may e.g. be done based on reciprocity (UL measurements indicate the conditions on DL) and may be used for DL beam direction control. Beam management may also be done based on wireless communication device reports on beam weights, i.e. beam direction, to be used for being optimal in DL. Beam management is also using signal strength and signal quality as cell management does. Cell measurements are much less dynamic and is basically only based on signal strength and signal quality measured on the cell pilot transmission which is static in terms of direction and power. Thus, beam management uses at least directivity as input as compared to cell management.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless communication device for managing communication in a wireless communications network, the method comprising:
   obtaining an indicator indicating a machine-learning model and one or more trained model parameters for the machine-learning model, wherein the machine-learning model is related to an event being one of the following events: a handover procedure, a cell reselection procedure, and a beam reselection procedure;
   selecting the machine-learning model based on the obtained indicator;
   executing the selected machine-learning model using the obtained one or more trained model parameters; and
   triggering a process, being associated with the event, based on an output of the executed machine-learning model.

2. The method according to claim 1, wherein the process, being associated with the event, is one or more of the following: measuring signals of one or more cells or beams; sending one or more measurement reports about serving and/or neighbouring cells or beams to a radio network node serving the wireless communication device; and initiating a conditional handover or a cell or beam reselection.

3. The method according to claim 1, wherein obtaining the indicator and the one or more trained model parameters is performed in negotiation with other wireless communication devices.

4. The method according to claim 1, wherein obtaining the indicator and the one or more trained model parameters comprises receiving, from a radio network node, the indicator and the one or more trained model parameters.

5. The method according to claim 4, further comprising:
   sending a capability indication to the radio network node, wherein the capability indication indicates a capability of supporting one or more machine-learning models at the wireless communication device.

6. The method according to claim 1, wherein the one or more trained model parameters comprise one or more weights for the machine-learning model indicated by the indicator.

7. The method according to claim 1, wherein the machine-learning model is based on a neural network.

8. The method according to claim 7, wherein inputs of the neural network are based on time series.

9. A method performed by a radio network node for managing communication in a wireless communications network, the method comprising:
   receiving, from one or more wireless communication devices, data associated with measurements performed by the one or more wireless communication devices;
   training, based on the received data, one or more model parameters of a machine-learning model for the one or more wireless communication devices, wherein the machine-learning model is related to an event being one of the following events: a handover procedure, a cell reselection procedure, and a beam reselection procedure; and providing, to a wireless communication device, an indicator indicating the machine-learning model and the one or more trained model parameters for the machine-learning model.

10. The method according to claim 9, further comprising:
selecting the machine-learning model out of a number of machine-learning models based on a capability, of the wireless communication device, of supporting one or more machine-learning models and/or a position of the wireless communication device.

11. The method according to claim 10, further comprising:
receiving a capability indication from the wireless communication device, wherein the capability indication indicates the capability, of the wireless communication device, of supporting one or more machine-learning models.

12. The method according to claim 9, wherein the received data comprises one or more of the following: current serving beam or cell; direction of one or more neighbouring beams; measured signal strength or quality for one or more neighbouring beams or cells on a serving frequency; measured signal strength or quality for one or more neighbouring beams or cells on one or more other frequencies than the serving frequency; timing advance for the serving beam or cell; pre-coder matrix index; block error rate; capability of supporting one or more machine-learning models of the one or more wireless communication devices; and movement related data of the one or more wireless communication devices.

13. The method according to claim 9, wherein different indicators and/or different one or more trained model parameters are provided for different beams, cells or regions of cells.

14. The method according to claim 9, wherein the one or more trained model parameters comprise one or more weights for the machine-learning model indicated by the indicator.

15. The method according to claim 9, wherein the machine-learning model is based on a neural network.

16. The method according to claim 15, wherein inputs of the neural network are based on time series.

17. A wireless communication device for managing communication in a wireless communications network, wherein the wireless communication device comprises a processing circuitry and a memory, said memory containing instructions executable by said processing circuitry whereby said wireless communication device is configured to:
obtain an indicator indicating a machine-learning model and one or more trained model parameters for the machine-learning model, wherein the machine-learning model is related to an event being one of the following events: a handover procedure, a cell reselection procedure, and a beam reselection procedure;
select the machine-learning model based on the obtained indicator;
execute the selected machine-learning model using the obtained one or more trained model parameters; and
trigger a process, being associated with the event, based on an output of the executed machine-learning model.

18. The wireless communication device according to claim 17, wherein the process, being associated with the event, is one or more of the following: measuring signals of one or more cells or beams; sending one or more measurement reports about serving and/or neighbouring cells or beams to a radio network node serving the wireless communication device; and initiating a conditional handover or a cell or beam reselection.

19. A radio network node for managing communication in a wireless communications network, wherein the radio network node comprises a processing circuitry and a memory, said memory containing instructions executable by said processing circuitry whereby said radio network node is configured to:
receive, from one or more wireless communication devices, data associated with measurements performed by the one or more wireless communication devices;
train, based on the received data, one or more model parameters of a machine-learning model for the one or more wireless communication devices, wherein the machine-learning model is related to an event being one of the following events: a handover procedure, a cell reselection procedure, and a beam reselection procedure; and
provide to a wireless communication device, an indicator indicating the machine-learning model and the one or more trained model parameters for the machine-learning model.

20. The radio network node according to claim 19, wherein the radio network node is further configured to:
select the machine-learning model out of a number of machine-learning models based on a capability, of the wireless communication device, of supporting one or more machine-learning models and/or a position of the wireless communication device.

* * * * *